3,100,214
PENTALENYL MANGANESE TRICARBONYL AND
PROCESSES FOR SAME
Thomas H. Coffield, Heidelberg, Germany, assignor to Ethyl Corporation, New York, N.Y., a corporation of Virginia
No Drawing. Filed Jan. 12, 1960, Ser. No. 1,854
9 Claims. (Cl. 260—429)

This invention relates to novel organometallic compounds and their mode of preparation. More specifically, the invention relates to certain novel pentalenyl manganese tricarbonyl compounds and their mode of preparation.

It is an object of this invention to provide novel organometallic compounds and a method for their preparation. A further object is to provide certain novel pentalenyl manganese tricarbonyl compounds and a mode for their preparation which involves reaction of a cyclooctatetraene compound and a manganese carbonyl compound.

My invention, therefore, involves the preparation of certain pentalenyl manganese tricarbonyl compounds having the formula:

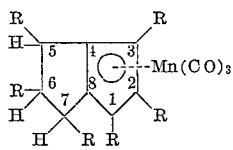

In the formula, R is a monovalent substituent group which preferably contains up to about ten carbon atoms and can be, for example, an alkyl, halogen, aryl, alkaryl, aralkyl, alkenyl, cycloalkenyl, hydrogen or cycloalkyl radical. Preferably, the total number of carbon atoms present in all of the R substituent groups does not exceed 20 carbon atoms. Examples of compounds within the scope of my invention, as defined above, are tetrahydropentalenyl manganese tricarbonyl, 1-methyltetrahydropentalenyl manganese tricarbonyl, 1,2-dimethyltetrahydropentalenyl manganese tricarbonyl, 5-phenyltetrahydropentalenyl manganese tricarbonyl, 2-(4-phenylbutyl)-tetrahydropentalenyl manganese tricarbonyl, 1-benzyl-2-methyl-3-ethyl-5-phenyl-6-methyl - 7 - propyl-tetrahydropentalenyl manganese tricarbonyl, 2-cyclohexyltetrahydropentalenyl manganese tricarbonyl, 2-(2,4-dimethyl phenyl) tetrahydropentalenyl manganese tricarbonyl, 1,3-dichloro tetrahydropentalenyl manganese tricarbonyl, 5 - (2 - hexenyl)tetrahydropentalenyl manganese tricarbonyl, and 2-cyclopentenyl tetrahydropentalenyl manganese tricarbonyl.

My compounds are prepared by reacting a cyclooctatetraene compound having the formula

in which R is a monovalent substituent group other than hydrogen as previously defined, and $x$ is an integer ranging from zero to six. Preferably, $x$ is an integer ranging from zero to three. R is not hydrogen in the above formula because it is represented as a substituent group which is present in place of a hydrogen atom in cyclooctatetraene.

The manganese carbonyl reactant employed in my process may be any member of a number of types of representative manganese carbonyl compounds. It can be, for example, dimanganese decacarbonyl or a substituted manganese carbonyl compound. Typical of the various types of substituted manganese carbonyl compounds which may be employed are the following:

(1) Compounds having the formula $[ZMn(CO)_4]_n$ where $n$ is either one or two, and Z is a ligand containing a group VA element, i.e., phosphorus, arsenic, nitrogen, antimony or bismuth, which is bonded to manganese. Typical of such compounds are triphenylarsine manganese tetracarbonyl, triethylphosphine manganese tetracarbonyl, triethylarsine manganese tetracarbonyl, triphenylstibine manganese tetracarbonyl, triethylstibine manganese tetracarbonyl, tricyclohexylphosphine manganese tetracarbonyl dimer, nitrosyl manganese tetracarbonyl, and triphenylphosphine manganese tetracarbonyl.

(2) Compounds having the formula $ZMn(CO)_4X$ where X is a halogen atom, i.e., chlorine, bromine or iodine, and Z is a ligand containing a group VA element. Typical of such compounds are ammonia manganese tetracarbonyl bromide, ammonia manganese tetracarbonyl chloride, ammonia manganese tetracarbonyl iodide, and the like.

(3) Compounds having the formula $ZMn(CO)_3X$ where X is a halogen, and Z is either two molecules of a ligand containing a group VA element, or a single molecule containing two atoms of a group VA element within the molecule, both of which are bonded to the manganese atom. Typical examples of such compounds are orthophenanthroline manganese tricarbonyl bromide, bis(triphenylphosphine) manganese tricarbonyl bromide, dipyridine manganese tricarbonyl bromide, bis(triphenylarsine)manganese tricarbonyl chloride, and the like.

(4) Compounds having the formula $ZMn(CO)_5$ wherein Z is a univalent substituent group which may contain up to about 16 carbon atoms and may be, for example, an alkyl, aryl, cycloalkyl, aralkyl, alkaryl, alkenyl, halogen or hydrogen radical. Typical of such compounds are methylmanganese pentacarbonyl, chloromanganese pentacarbonyl, bromomanganese pentacarbonyl, benzoylmanganese pentacarbonyl, phenylmanganese pentacarbonyl, ethylmanganese pentacarbonyl, propionylmanganese pentacarbonyl, acrylylmanganese pentacarbonyl, benzylmanganese pentacarbonyl, palmitoylmanganese pentacarbonyl, iodomanganese pentacarbonyl, and the like.

Since the manganese carbonyl compound is generally the more expensive of the two reactants utilized in my process, it is desirable to use excess quantities of the cyclooctatetraene reactant to increase the yield of product based on the amount of the manganese carbonyl reactant employed. I generally employ from about eight to about 50 moles of the cyclooctatetraene reactant for each mole of the manganese carbonyl reactant. In those cases where the cyclooctatetraene reactant is more expensive than the manganese carbonyl reactant, I employ the cyclooctatetraene reactant in excess quantities. The quantities of reactants employed are not critical, however, and greater or lesser amounts than that specified can be used if desired.

My process is generally carried out in the presence of a non-reactive solvent. The nature of the solvent is not critical although I have found that preferred solvents are ethers, ketones and aldehydes since their use generally results in a higher yield of product. Typical of these preferred solvents are tetrahydrofuran, acetone, dioxane, dimethyl ether of diethylene glycol, 2-pentanone, butyraldehyde, cyclohexanone, 2-hexanone, diethyl ether of diethylene glycol, ethylene glycol diethyl ether, and propionaldehyde.

Typical of other reaction solvents which may be employed in my process are high boiling saturated hydrocarbons such as n-octane, n-decane, and other paraffinic hydrocarbons having up to about 20 carbon atoms such as eicosane, pentadecane, and the like. Typical aromatic solvents are mesitylene, benzene, toluene, xylenes, either pure or mixed, and the like. Typical ether solvents are ethyl octyl ether, ethyl hexyl ether, diethylene glycol methyl ether, diethylene glycol diethyl ether, diethylene glycol dibutyl ether, ethylene glycol dimethyl ether, ethylene glycol diethyl ether, trioxane, tetrahydrofuran, ethylene glycol dibutyl ether and the like. Ester solvents which may be employed include pentyl butanoate, ethyl decanoate, ethyl hexanoate, and the like. Silicone oils such as the dimethyl polysiloxanes, bis(chlorophenyl) polysiloxanes, hexapropyl disilane, and diethyldipropyldiphenyldisilane may also be employed. Other ester solvents are those derived from succinic, maleic, gluteric, adipic, pimelic, suberic, azelaic, sebacic and pinic acids. Specific examples of such esters are di-(2-ethylhexyl) adipate, di-(2-ethylhexyl) azelate, di-(2-ethyl hexyl) sebacate, di-(methylcyclohexyl) adipate and the like.

The process is preferably conducted with agitation of the reaction mixture. Although agitation is not critical to the success or failure of the process, its use is preferred since it accomplishes a smooth and even reaction rate.

The time required for the process varies depending on the other reaction variables. In general, however, a time period from about 30 minutes to about 24 hours is sufficient.

In general, my process is carried out at temperatures between about 115 to about 180° C. Preferably, however, temperatures in the range from about 140 to about 160° C. are employed since, within this range, relatively higher yields are obtained with a minimum of undesirable side reactions. The pressure under which my process is carried out is not critical. Preferably, it is conducted at a range between atmospheric pressure and 1,000 p.s.i.g. although pressures up to 50,000 p.s.i.g may be employed if desired.

The reaction is preferably carried out under a blanketing atmosphere of an inert gas such as nitrogen, helium, argon and the like. The presence of an inert gas serves a two-fold function which is to exclude oxidizing gases and further to control the overall pressure in the reaction system.

To further illustrate my novel process and the novel compounds produced thereby, there are presented the following examples in which all parts and percentages are by weight unless otherwise indicated.

*Example I*

A solution comprising 12 parts of dimanganese decacarbonyl, 26 parts of cyclooctatetraene and 666 parts of tetrahydrofuran was placed in an autoclave and pressurized to 500 p.s.i.g. with nitrogen. The autoclave was heated to 150° C. and 790 p.s.i.g., and these conditions were maintained for seven hours. The reaction mixture was then removed from the autoclave, and the solvent was removed in vacuo. The viscous residue was distilled to give 10 parts of cyclooctatetraene in a mixture of a yellow solid and oil. The mixture was chromatographed on alumina. The first fraction was manganese carbonyl, and the second fraction was an oil whose infrared spectrum and elemental analysis identified it to be tetrahydropentalenyl manganese tricarbonyl.

*Example II*

A solution comprising one mole of triphenylphosphine manganese pentacarbonyl and 50 moles of cyclooctatetraene in acetone is charged to a reaction vessel. The reaction vessel is heated, with agitation, to 180° C. under a nitrogen pressure of 1,000 p.s.i.g. These conditions are maintained for six hours after which the reaction product is discharged, filtered, and solvent is removed from the filtrate by heating in vacuo. The residue is dissolved in low-boiling petroleum ether and chromatographed on alumina and the solvent is removed from the eluant to give a good yield of tetrahydropentalenyl manganese tricarbonyl.

*Example III*

A solution comprising one mole of methyl manganese pentacarbonyl and eight moles of 1-(4-phenylbutyl)-cyclooctatetraene in tetrahydrofuran is charged to an autoclave and heated to a temperature of 115° C. under a nitrogen pressure of 200 p.s.i.g. The reaction mixture is maintained at these conditions with stirring for 24 hours after which the reaction product is discharged. Filtration of the reacion product followed by removal of solvent from the filtrate and chromatography of the resulting residue gives a good yield of phenylbutyl-tetrahydropentalenyl manganese tricarbonyl.

*Example IV*

A solution comprising 10 moles of 1,2-dimethylcyclooctatetraene and one mole of ammonia manganese tetracarbonyl bromide in n-nonane is charged to a reaction vessel and heated to a temperature of 140° C. under a nitrogen pressure of 50 p.s.i.g. These conditions are maintained, with agitation of the reaction mixture, for 12 hours. The reaction product is then discharged and a good yield of dimethyltetrahydropentalenyl manganese tricarbonyl is obtained by means of chromatographic separation as in the previous examples.

*Example V*

A solution comprising one mole of bis(triphenylarsine) manganese tricarbonyl bromide and 15 moles of phenylcyclooctatetraene in octanal is charged to a reaction vessel and heated to a temperature of 160° C. under a nitrogen pressure of 100 p.s.i.g. These conditions are maintained, with stirring, for four hours after which the reaction product is discharged and filtered. Solvent is removed from the filtrate by heating in vacuo; the residue is dissolved in low-boiling petroleum ether and chromatographed on alumina to give a good yield of phenyl-tetrahydropentalenyl manganese tricarbonyl.

*Example VI*

A solution comprising nine moles of cyclopentenylcyclooctatetraene and one mole of orthophenanthroline manganese tricarbonyl bromide in propionaldehyde is heated with agitation to 130° C. under a nitrogen pressure of 5,000 p.s.i.g. These conditions are maintained for eight hours. The reaction product is then discharged and a good yield of cyclopentenyl-tetrahydropentalenyl manganese tricarbonyl is separated therefrom by means of chromatographic separation.

*Example VII*

A solution of 16 moles of 1,3-dichlorocyclooctatetraene and one mole of benzyl manganese pentacarbonyl in benzene is charged to an evacuated autoclave and heated to a temperature of 170° C., with stirring, under a nitrogen pressure of 500 p.s.i.g. These conditions are maintained for 14 hours after which the reaction product is discharged, filtered, and solvent is removed from the filtrate by heating in vacuo. The residue is dissolved in low-boiling petroleum ether and chromatographed on alumina to yield an eluant which gives a good yield of dichlorotetrahydropentalenyl manganese tricarbonyl on removal of solvent.

*Example VIII*

A solution comprising 20 moles of methylcyclooctatetraene and one mole of dimanganese decacarbonyl in pentanone is charged to a reaction vessel and heated, with stirring, to a temperature of 150° C. under a nitrogen pressure of 1,000 p.s.i.g. These conditions are maintained for 11 hours after which the reaction product is discharged, filtered, and solvent is removed from the filtrate by heating in vacuo. A good yield of methyl-tetrahydropentalenyl manganese tricarbonyl is obtained from the residue by means of chromatographic separation as in the previous examples.

Example IX

A solution comprising 13 moles of hexenylcyclooctatetraene and one mole of benzoyl manganese pentacarbonyl in diethylene glycol dimethyl ether is charged to an autoclave and heated, with stirring, to a temperature of 145° C. under a nitrogen pressure of 25 p.s.i.g. After five hours at these conditions, the reaction product is discharged and filtered. Solvent is removed from the filtrate by heating at reduced pressures and the resulting residue is chromatographed on alumina to give a good yield of hexenyl-tetrahydropentalenyl manganese tricarbonyl.

In order to definitely prove the structure of the compounds of my invention, an independent synthesis was made of the tetrahydropentalenyl manganese tricarbonyl which is obtained on reaction of cyclooctatetraene and manganese carbonyl as in Example I. This independent synthesis is presented in the following example.

Example X

A solution comprising 21.4 grams of lithium aluminum tri(tert-butoxy) hydride in 49 ml. of diethylene glycol dimethyl ether was added to a stirred solution comprising 16.5 grams of [(chloroformyl)cyclopentadienyl] manganese tricarbonyl in 215 ml. of diethylene glycol dimethyl ether. The addition took place over a one and one-half hour period during which the temperature of the [(chloroformyl)cyclopentadienyl] manganese tricarbonyl solution was maintained at −78° C. After addition was complete, the reaction mass was allowed to warm to room temperature. It was poured onto ice and acidified to Congo red with hydrochloric acid. The mixture was extracted with ether; the ether was dried, and the solvent was removed to yield an oil. The oil was distilled to give 11.6 grams (81 percent yield) of [(formyl)cyclopentadienyl] manganese tricarbonyl which was a low-melting solid.

A mixture comprising 11.6 grams of [(formyl)cyclopentadienyl] manganese tricarbonyl, 5.3 grams of malonic acid and 4.66 grams of α-picoline was heated on a steam bath for two hours. Evolution of 800 ml. of gas was observed. The theoretical evolution of gas was 1100 ml. The reaction mixture was poured into water, and this was extracted with ether. The ether extracts were further extracted with carbonate solution. Acidification of the carbonate extracts gave 8.3 grams (61 percent yield) of [(2-carboxyvinyl)cyclopentadienyl] manganese tricarbonyl which was a yellow solid. The melting point of the product, after recrystallization from chloroform-benzene solution, was 156–157° C.

A solution comprising 0.5 gram of [(2-carboxyvinyl)-cyclopentadienyl] manganese tricarbonyl in 20 ml. of ethanol was hydrogenated over Raney nickel at atmospheric pressure. After one hour, the hydrogen uptake had ceased, and the reaction mixture was then filtered and the solvent removed. Recrystallization of the remaining oil from chloroform-petroleum ether solution gave 0.3 gram (60 percent yield) of [(2-carboxyethyl)-cyclopentadienyl] manganese tricarbonyl which was a yellow solid having a melting point of 136–138° C.

To 40 grams of polyphosphoric acid was added 4.67 grams of [(2-carboxyethyl)cyclopentadienyl] manganese tricarbonyl. The mixture was stirred and heated at 70–90° C. for three hours. After pouring onto ice, the mixture was extracted with ether. The ether extracts were further extracted with carbonate solution after which they were dried and the solvent was removed to yield 2.8 grams (65 percent yield) of tetrahydro-4-oxopentalenyl manganese tricarbonyl.

To a mixture comprising five grams of amalgamated zinc, 30 ml. of water, 30 ml. of hydrochloric acid, 10 ml. of toluene and three ml. of dioxane was added one gram of tetrahydro-4 oxopentalenyl manganese tricarbonyl. The mixture was stirred at reflux for 24 hours. At the three hour mark, 30 ml. of hydrochloric acid and five grams of amalgamated zinc were added, and the 18 hour mark 10 ml of hydrochloric acid were added. After the reaction mixture had cooled, the liquid was decanted and extracted with ether. The ether extracts were extracted several times with a 10 percent solution of hydrochloric acid after which they were dried, and the solvent was removed. The residual oil was chromatographed on alumina with benzene. The first fraction was taken and distilled, after the removal of the solvent, to yield 0.3 gram (32 percent yield) of a yellow solid having a melting point of 34.5–35.5° C. This was shown by means of infrared absorption, mixed melting point, vapor-phase chromatography and X-ray defraction patterns to be tetrahydropentalenyl manganese tricarbonyl which was in all respects identical to the tetrahydropentalenyl manganese tricarbonyl produced by reaction of cyclooctatetraene and manganese carbonyl as in Example I.

The compounds of my invention can be used in forming metallic mirrors comprising a layer or coating of manganese on a substrate material. These mirrors are formed by thermally decomposing one of the compounds of my invention at a temperature above 400° C. On the decomposition of the compound, manganese deposits on adjacent surfaces to form thereon a metallic mirror. These mirrors have the useful and desirable property of protecting the base material against corrosion. Also, they can be used to decorate the base material as by applying the mirror to a base material that is covered by a stencil. The compounds of the present invention can be deposited on glass, glass cloth, resins and other insulating supports. It is preferred that inert gases, e.g. argon, be used to protect the base material from oxidation during the mirror-forming operation.

Deposition on glass cloth illustrates one form of the applied processes. A glass cloth band weighing one gram is dried for one hour in an oven at 150° C. Then together with 0.5 gram of tetrahydropentalenyl manganese tricarbonyl, it is enclosed in a glass tube devoid of air and heated at 400° C. for one hour, after which time the tube is cooled and opened. The cloth has a uniform metallic appearance and exhibits a gain in weight of about 0.02 gram. The cloth has decreased resistivity and each fiber is a conductor. Application of current to the cloth causes an increase in its temperature. Thus, a conducting cloth has been prepared. The cloth can be used to reduce static electricity, for decoration, for thermal insulation by reflection, and as a heating element.

The compounds of my invention have further utility as additives to residual and distillate fuels generally, e.g., jet fuels, home heater fuels and diesel fuels, to reduce smoke and/or soot. Further, they are excellent antiknocks when used in fuels and are lubricity improvers when used in lubricating oils. My compounds, when used as antiknocks, may be used alone or in combination with other additives such as scavengers, deposit-modifying agents containing phosphorus or boron and in combination with other antiknock agents such as tetraethyllead. They may be used in fuels containing up to about eight grams of lead antiknock per gallon.

When present in a liquid hydrocarbon fuel used in a spark ignition internal combustion engine, my compounds may be present in a concentration range from about 0.05 to about 10 grams of manganese per gallon. A preferred concentration range is from about 1.0 to about six grams of manganese per gallon of fuel.

My compounds can be added directly to the hydrocarbon fuels or lubricating oils after which the mixture is agitated until a homogeneous fluid results. Also my compounds may be first blended into concentrated fluids containing solvents such as kerosene, antioxidants and other antiknock agents such as tetraethyllead. The concentrated fluid can then be blended with a hydrocarbon base material to form a fuel particularly adapted for use in a spark ignition internal combustion engine. When my compounds are employed in a concentrated fluid in combination with lead, my compounds are present in an amount so that for each gram of lead present there is a sufficient quantity of one or more of my compound to give between about 0.008 to about 10 grams of manganese. A preferred range comprises from about 0.01 to about six grams of manganese as a compound of the instant invention for each gram of lead as an organolead compound.

The scavengers employed in combination with my compounds are either phosphorus compounds or halohydrocarbons. The halohydrocarbon scavengers can be either aliphatic or aromatic with the halogen atoms being attached to carbon atoms either in the aliphatic or aromatic portion of the molecule. The scavenger compounds may also contain carbon, hydrogen and oxygen such as, for example, haloalkyl ethers, halohydrins, haloesters, halonitro compounds and the like. When used in forming an antiknock fluid, the atom ratio of metal to halogen ranges from about 50:1 to about 1:12. The halohydrocarbon scavengers normally contain from about two to about 20 carbon atoms in the molecule.

When a phosphorus scavenger is employed with my compounds in formulating an antiknock fluid, it can be present in an amount between about 0.01 to about 1.5 theories of phosphorus. A theory of scavenger is that amount of scavenger which will react completely with the metal present in the antiknock mixture. Reaction between a halide scavenger and lead gives the lead dihalide. Thus, a theory of halogen scavenger represents, in the case of lead, two atoms of halogen for each atom of lead. A phosphorus scavenger reacts with lead to form lead ortho-phosphate, $Pb_3(PO_4)_2$. Thus, a theory of phosphorus represents, in the case of lead, an atom ratio of two atoms of phosphorus to three atoms of lead. Theories of phosphorus or halohydrocarbon scavengers of other metals are computed in the same manner by stoichiometric calculations.

Further, my compounds may be incorporated in paints, varnish, printing inks, synethetic resins of the drying oil type, oil enamels and the like to impart improved drying characteristics to such compositions. Another important utility of my compounds is their use as chemical intermediates in the preparation of metal containing polymeric materials.

Having fully defined the novel compounds of my invention, their novel mode of preparation and their manifold utilities, I desire to be limited only within the lawful scope of the appended claims.

I claim:

1. Pentalenyl manganese tricarbonyl compounds having the formula:

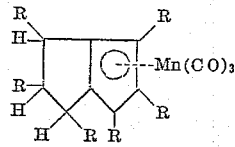

in which R is selected from the group consisting of hydrogen and a monovalent hydrocarbon substituent group which contains up to about 10 carbon atoms, and the total number of carbon atoms present in all of the R substituent groups does not exceed 20 carbon atoms.

2. Tetrahydropentalenyl manganese tricarbonyl.

3. A process comprising reacting a cyclooctatetraene compound having up to 20 carbon atoms and having the formula:

wherein R is selected from the class consisting of hydrogen and a monovalent hydrocarbon substituent having up to about 10 carbon atoms, and $x$ is an integer having a value of 0 to 6; with a manganese carbonyl compound selected from the class consisting of dimanganese decacarbonyl and the compounds having the formula $[ZMn(CO)_4]_n$, wherein $n$ is an integer having a value of 1 to 2, and Z is a ligand containing a group VB element, said ligand being selected from the class consisting of trialkyl phosphine, trialkyl arsine, trialkyl stibine, and trialkyl bismuthine radicals wherein the alkyl groups have one to six carbon atoms, and triphenyl phosphine, triphenyl arsine, triphenyl stibine and triphenyl bismuthine radicals;

$(NH_3)Mn(CO)_4X$, wherein X is a halide radical selected from the class consisting of chloride, bromide and iodide;

$ZMn(CO)_5$, wherein Z is a univalent substituent group selected from the class consisting of hydrogen, halogen and organic radicals having up to about 16 carbon atoms, said radicals being selected from the class consisting of alkyl, aryl, cycloalkyl, aralkyl, alkaryl, alkenyl, and acyl radicals; and $ZMn(CO)_3X$, when in X is selected from the class consisting of chloride and bromide and Z is selected from the class consisting of orthophenanthroline, bis(triphenylphosphine), dipyridine and bis(triphenyl) arsine.

4. The process of claim 3 wherein the manganese carbonyl reactant has the formula $$[ZMn(CO)_4]_n$$

wherein $n$ is an integer having a value of 1 to 2, and Z is a ligand containing a group VB element, said ligand being selected from the class consisting of trialkyl phosphine, trialkyl arsine, trialkyl stibine and trialkyl bismuthine radicals wherein the alkyl groups have one to six carbons, and triphenyl phosphine, triphenyl arsine, triphenyl stibine and triphenyl bismuthine radicals.

5. The process of claim 3 wherein the manganese carbonyl reactant has the formula $$(NH_3)Mn(CO)_4X$$

wherein X is a halide radical selected from the class consisting of chloride, bromide and iodine.

6. The process of claim 3 wherein the manganese carbonyl reactant has the formula $$ZMn(CO)_3X$$

wherein X is selected from the class consisting of chloride and bromide and Z is selected from the class consisting of orthophenanthroline, bis(triphenylphosphine), dipyridine and bis(triphenylarsine).

7. The process of claim 3 wherein the manganese carbonyl reactant has the formula $$ZMn(CO)_5$$

wherein Z is a univalent substituent group selected from the class consisting of hydrogen, halogen, and organic radicals having up to about 16 carbon atoms, said radicals being selected from the class consisting of alkyl, aryl, cycloalkyl, aralkyl, alkaryl, alkenyl and acyl radicals.

8. The process of claim 3 wherein the cyclooctatetraene compound is cyclooctatetraene.

9. The process for the formation of tetrahydropentalenyl manganese tricarbonyl, said process comprising reacting dimanganese decacarbonyl with cyclooctatetraene.

References Cited in the file of this patent

Chatt et al.: "Journal of the Chemical Society" (London), December 1957, pages 4735–4741.

Manuel et al.: "Preceedings of the Chemical Society" (London), March 1959, page 90 relied on.

Rausch et al.: "Chemical and Industry," July 25, 1959, pages 957–958.

Fischer et al.: Chem. Ber. Deut. 92, No. 77, November 10, 1959, pages 2995–2998.